United States Patent [19]

Young

[11] Patent Number: 4,754,742

[45] Date of Patent: Jul. 5, 1988

[54] PRE-HEATER FOR AIR

[76] Inventor: James W. Young, 2513 Oakwood Dr., P.O. Box 531311, Grand Prairie, Tex. 75051

[21] Appl. No.: 770,884

[22] Filed: Aug. 30, 1985

[51] Int. Cl.$^4$ .......................................... F02M 31/02
[52] U.S. Cl. .................................. 123/556; 123/536; 123/539
[58] Field of Search ............... 123/536, 537, 538, 539, 123/556, 549

[56] References Cited

U.S. PATENT DOCUMENTS

| 1,914,063 | 6/1933 | Barbarou | 123/556 |
| 2,369,937 | 2/1945 | Baster | 123/556 |
| 2,576,450 | 11/1951 | Marval | 123/536 |
| 2,656,824 | 10/1953 | Devaux | 123/536 |
| 2,756,730 | 7/1956 | Patchan | 123/556 |
| 3,531,931 | 10/1970 | Caruso | 60/30 |
| 3,712,029 | 1/1970 | Charlton | 55/100 |
| 3,761,062 | 9/1973 | King | 261/1 |
| 3,805,492 | 4/1974 | King | 55/8 |
| 3,832,443 | 8/1974 | Hass | 423/213.7 |
| 3,903,694 | 9/1975 | Aine | 60/274 |
| 3,963,408 | 6/1976 | Youngberg | 431/2 |
| 4,043,308 | 8/1977 | Cerkanowicz | 123/536 |
| 4,192,270 | 3/1980 | Beckman | 123/52 MY |
| 4,195,606 | 4/1980 | Wallis | 123/539 |
| 4,308,844 | 1/1982 | Persinger | 123/539 |
| 4,376,637 | 3/1983 | Yang | 55/2 |
| 4,386,595 | 6/1983 | Young | 123/539 |
| 4,404,948 | 9/1983 | Feltrin | 123/546 |
| 4,500,475 | 2/1985 | Csaszar et al. | 123/537 |
| 4,519,357 | 5/1985 | McAllister | 123/539 |

FOREIGN PATENT DOCUMENTS

| 673253 | 10/1963 | Canada | 123/536 |
| 510198 | 11/1920 | France | 123/557 |
| 269808 | 4/1927 | United Kingdom | 123/539 |

Primary Examiner—Willis R. Wolfe, Jr.
Assistant Examiner—M. Macy

[57] ABSTRACT

An improved air treatment device that will reduce or eliminate exhaust pollutants of internal combustion engines, by treating air prior to its introduction into the carburetor with ultra violet rays and heat, resulting in more complete combustion. The device provides an improved pre-heater for the air by utilizing the circulation of existing fluid as a heat source.

7 Claims, 2 Drawing Sheets

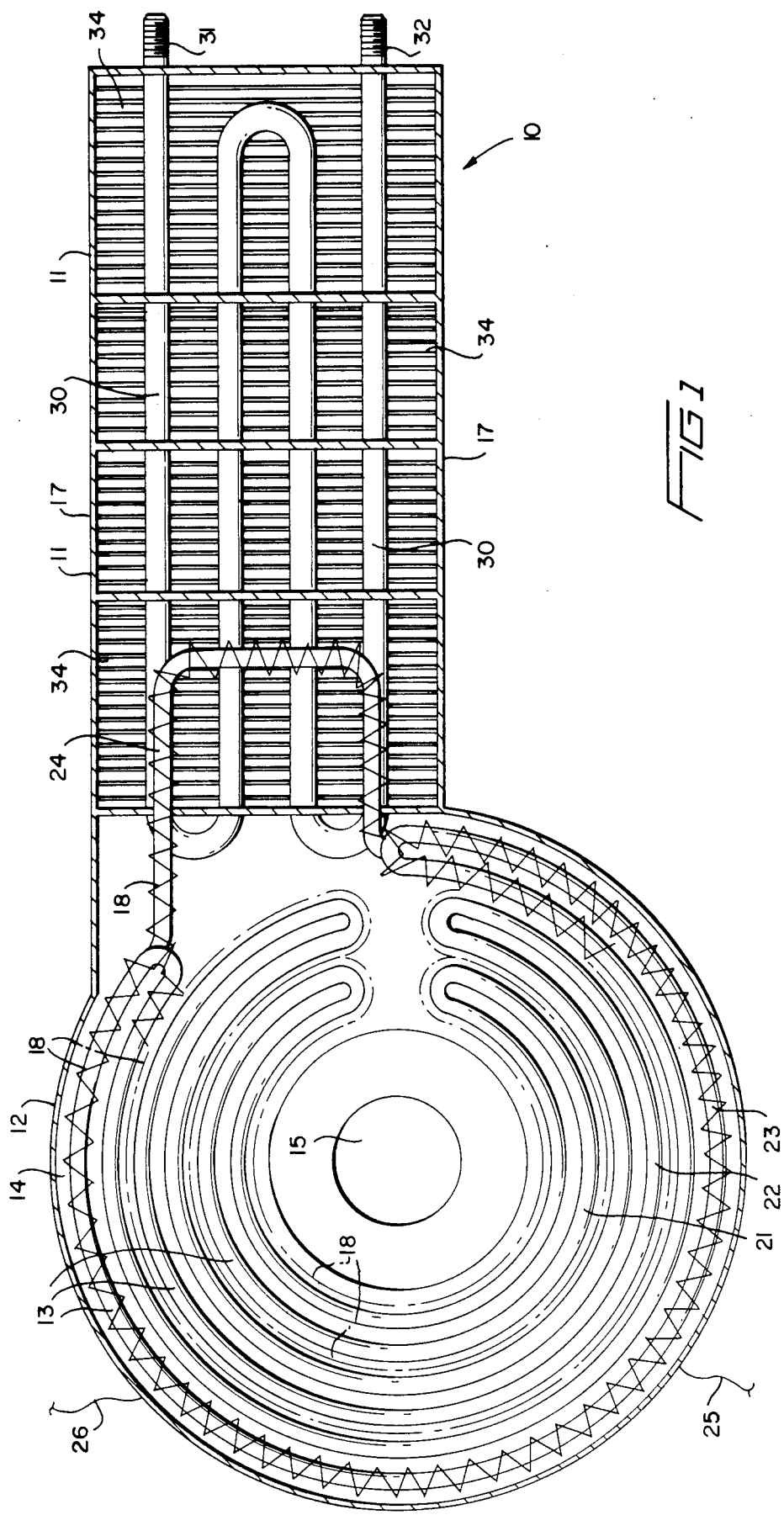

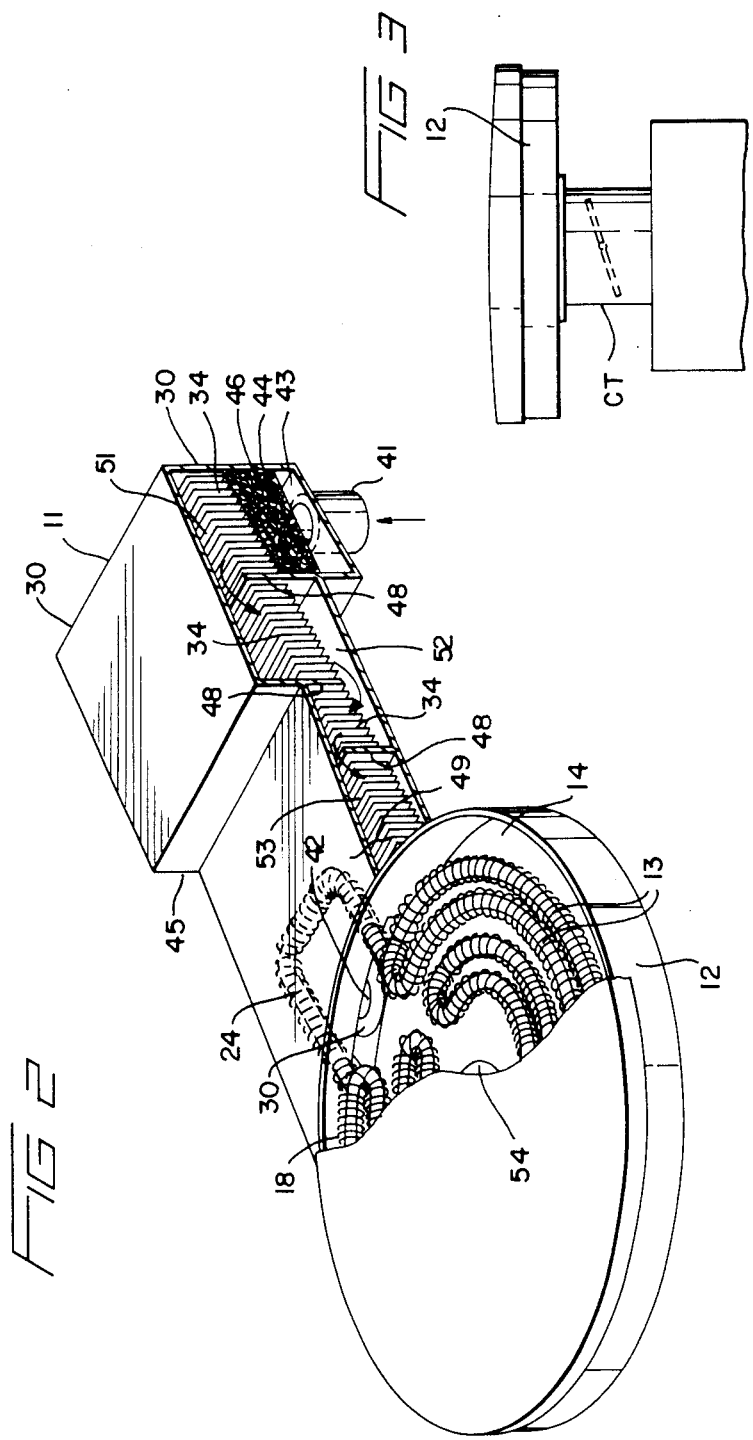

PRE-HEATER FOR AIR

FIELD OF INVENTION

The improved air treatment device of the present invention relates generally to devices designed to reduce the release of pollutants into the atmosphere emanating from the exhaust of internal combustion engines. Specifically, the present invention relates to devices that attempt to reduce such pollution by treating the air and/or fuel prior to combustion in order to achieve a more complete and efficient burn that will eliminate or reduce harmful pollutants.

BACKGROUND OF THE INVENTION

The prior art has seen various devices, methods and adaptations for internal combustion engines designed to reduce the discharge of various nitrous oxides, hydrocarbons and other pollutants into the atmosphere.

These attempts range from merely treating exhaust emmisions after combustion but before release into the atmosphere, to attempts to improve the efficiency of the actual combustion itself in order to accomplish a cleaner burn and thus reduce emmisions. In this latter catagory, some prior attempts to effect this result have included atomization of the fuel into fine particles, the heating and/or cooling of the fuel, or other means to finely balance the air/fuel ratio in the mixture in order to provide for a more efficient combustion.

Of particular interest herein is the air treating device for fuel burning engines, U.S. Pat. No. 4,386,595, to the present inventor, wherein a means was provided to subject air to ultra violet rays and heat prior to its combination with fuel and subsequent combustion. It was found with the above device that certain disadvantages resulted from the requirement of additional electrical generation means as well as the need for the attachment of a relatively cumbersome apparatus to the engine for pre-heating.

The improved air treatment device of the present invention overcomes these and other disadvantages of the above device, while at the same time increasing the effeciency of operation of the air treatment utilizing existing energy sources found in the vehicle, and providing a means of more effeciently heating and treating the intake air to improve engine combustion.

MATERIAL INFORMATION DISCLOSURE

The following references are deemed of interest to the application, and are cited herein to assist in consideration of the claims.

Prior art includes U.S. Pat. No. 4,386,595, to Young, cited above, and references contained therein. Other art of interest includes U.S. Pat. No. 4,376,637, to Yang, and U.S. Pat. No. 4,404,948, to Feltrin, which disclose the use of fins for heat exchange purposes. See also U.S. Pat. No. 4,192,270, to Beckman. With regard to the use of engine fluids as a heat source, U.S. Pat. No. 1,914,063, to Barbarou, discloses the use of lubricating oil heat. U.S. Pat. No. 2,369,937, to Baster, and U.S. Pat. No. 2,756,730, to Patchan, are representative of a large body of art that disclose the use of radiator water heat as an energy source. U.S. Pat. Nos. 4,500,475, 4,308,844, 3,903,694, 3,832,443, 3,805,492, 3,761,062, 3,712,029, and 3,531,931, all disclose the use of baffle means to form a torturous passageway. See also U.S. Pat. No. 3,963,408, to Youngberg.

The above cited references only tangentially disclose the present invention. The closest art, as noted above, is U.S. Pat. No. 4,386,595, to Young that pre-treats air with a combination of ultraviolet rays and heat. The present invention differs sharply from the Young prior art in that it offers an increase in the efficiency of the air pre treatment while at the same time providing for the utilization of existing energy sources, thus dispensing with the requirement of additional energy and heat sources.

SUMMARY OF THE INVENTION

The above and other advantages of the present invention are achieved by providing an improved pre-heater for air comprising a housing with an inlet and an outlet. A tubular coil is disposed within the housing in a serpentine manner, said coil having a means for the introduction and exiting of a flow of fluid. Said fluid providing a heat source which is transferred from the coil to an array of baffle plates disposed throughout the major portion of the housing. The housing is further connected to a source of electricity to electronically charge the air, and is further connected to an ultra violet air treatment generator for the purpose of subjecting the air to ultra violet rays during the heating process.

DESCRIPTION OF THE FIGURES

FIG. 1 is a top plan view of the improved air pre-heater.

FIG. 2 is a perspective side view of the improved preheater for air.

FIG. 3 is an end view of FIG. 1 showing the circular housing disposed over a carburetor.

SPECIFICATIONS OF THE INVENTION

Referring to the drawings and more particularly to FIG. 1, the improved pre-heater for air is generally designated by the numeral 10. The housing 10 which includes an elongated portion 11, and a circular portion 12, is a replacement for a standard air filter housing found in vehicles is manufactured from any suitable material that possesses high heat and electronic resistance. Within the circular portion 14 of the housing 12, and in the space normally occupied by an air filter, is disposed a package of sealed tubes or envelopes 13, containing charges of inert gas such as helium, neon, argon, krypton and xenon, which can be selectively utilized with mercury. By chosing specific types of glass to form the tubes or envelopes, and charging these selected gases, either ultra-violet rays or heat will be discharged by the same when connected to a power source. The purpose of the charges tubes 13 is to emit rays and heat to cause the air to become chemically unstable and break down to enhance its coaction with the fuel.

As can be seen in FIG. 2, air is drawn through an inlet 41 which is an annular opening on the underside of the elongated portion 11. From the inlet 41, the air is introduced into a resevior 43, where it is spread out and further drawn through an air filter 46. Passing through the filter 46, the air is drawn upwardly through a series of baffle plates 34, and into a passageway 51, wherein the air is directed downwardly by means of a directional baffle 48, again through a series of baffle plates 34. The air then enters a second passageway 52, wherein the air is further directed upwardly through said baffle plates 34, and into a third passageway 53, through which air is directed over tube 24, and into the circular portion 14 of the housing section 12. As the air cascades over the tubes 13 within the housing section 12, the rays and heat cause the oxygen molecules to disperse, thereby increasing the available oxygen which enhances and facilatates the burning of the fuel as it passes downwardly into the carburetor. The expanding and continuous motion of the oxygen molecules lengthen the burning time of the mixture due to the availability thereof to cause a more complete burning of the mixture, thereby reducing the amount of pollutants discharged into the atmosphere. An additional benefit is that with more complete combustion, the demand for fuel is reduced, thus resulting in an increase in milage.

As can be seen in FIG. 1, the tube package 13 includes tubes 21, which contain neon gas, bunched with tubes 22 made of lime or vycor and quartz glass and tube 23 made from leaded glass. As in prior art U.S. Pat. No. 4,386,595, of the present inventor, these tubes will generate heat which will change the weight of the air by expanding it and simultaneously reducing any residual humidity after passage of the air through the present elongated section 11. Tube 24 is made of a lime glass or vycor and quartz glass and contains argon gas and mercury, and will emit ultra-violet rays which will cause the movement of oxygen molecules referred to above. Various combinations and numbers of tubes can be utilized with the prime considerations being the size of the engine and the nature of the air where the vehicle is being used. In addition, tube 24 is extended from the circular housing and extends into the elongated section of the housing 11 to cause emission of heat and ultra-violet rays to pre-treat the air. The tubes 21, 22, 23 and 24 are interconnected by a plurality of spaced sets of individual wide braided wires 18 which are threaded over and under these tubes in a configuration so that each tube is contacted by a wire as it passes therearound.

Leads 25 braid, and 26 electrodes, attach wires 18 to a power generator and a ground to complete the electrical circuit. By wrapping the tubes 13 in this fashion, there will be a feed back effect which will cause each of the tubes to be additionally heated due to its contact with the wire. The wire also serves to cushion the tubes within the housing.

The pre heat, or elongated section 11 of the housing 10 contains serpentine tubular coil means 30 defining an inlet 31 and an outlet 32. The inlet 31 is adapted to receive a hose or other suitable means for the introduction of transmission or other heated fluid causing the same to flow through said coil and exit at the outlet means 32 which is similarly adapted to receive a hose or other suitable means for the return of said fluid to its source. The array of spaced parallel baffle plates 34 are attached to the coil 30 and extend throughout the major portion of said housing 11, causing the air passing therethrough to flow in an undulating course. These plates 34, are preferrably spaced 1/16 inches apart and are made of a material suited to receive and retain heat transmitted from the heated fluid passing through the coil 30.

Referring again to FIG. 2, the pre heat section 11 is seen to include in serial fashion, an inlet 41, a resevoir 43, an air filter chamber 44, and an outlet 42. The housing is stepped 45 by means of a series of passageways 51, 52, and 53, in order to cause air to flow in an undulating manner. In operation, the air is sucked through the inlet 41 and into the resevoir 43 where it is spread out. The air is then drawn into the filter chamber 44 where it is forced through an air filter 46, which removes dust and other solid particles from the air. After filtering, the air is drawn through the baffle plates 34, which are attached by welding or other suitable means to the tubular coil means 30. The flow of air is then directed in an undulating manner by means of the stepped structure of the pre heat or elongated section 11 of the housing 10, as well as by the disposition of a series of directional baffles 48, which are disposed in at least three locations within the elongated section 11. As was shown above, and by referring to the Figure, the combination of housing structure and directional baffle disposition forces air to pass through the baffle plates 34, in at least three different locations within the elongated section.

In addition, the baffle plates 34 may be electrically charged by means of a wire 49, so as to charge the air as it passes through the pre heat section 11. Upon exiting through the outlet 42, the air is directed into the circular portion 14 of the housing section 12, wherein the air cascades over the tubes 13 within the housing section 12 wherein the air is subjected to further heat and ultra violet rays emiting from said tubes 13. An additional directional baffle 54, is located above the carburetor to divert air over and around the braided cable 18. An expansion/reduction plate is also provided for the circular housing section 12, to reduce or open the hole of various carburetor throats CT, see FIG. 3 in order to allow the device to fit a variety of engine sizes. Suitable fasteners such as straps or bolting means can be utilized for mounting the pre-heater within the vehicle.

What is new and desired to be secured by Letters Patent is:

1. A pre-heater for air comprising a housing having an elongated air inlet section and an air outlet section, heating means disposed within said inlet section heating air passing therethrough, said heating means comprising a coil disposed in a serpentine fashion within the inlet and being in fluid communication with a source of heated fluid, an array of baffle plates arranged in a substantial linear plane and disposed in said inlet section and being secured to said coil throughout the length thereof and extending throughout the major portion of said inlet and extracting heat from the fluid passing therethrough, said inlet section defining a stepped profile throughout its length causing air to flow through said baffle plates in an undulating manner from said inlet section to said outlet section having a plurality of heat and ultra-violet emitting tubes disposed therein, and power generating means connected to said tubes to energize the same the cause the heated air to be further dispersed.

2. A pre-heater for air comprising a housing having an elongated air inlet section and an air outlet section, heating means disposed within said inlet section heating air passing therethrough, said heating means comprising a coil disposed in a serpentine fasion within the inlet and being in fluid communication with a source of heated fluid, said serpentine coil having an inlet and an outlet for receiving heated transmission fluid and returning the same thereto, an array of baffle plates arranged in a substantial linear plane and disposed in said inlet section adjacent said heating means and extending throughout the major portion thereof, said inlet section defining a stepped profile throughout its length causing air to flow through said baffle plates in an undulating manner from said inlet section to said outlet section with said oulet section having a plurality of heat and ultra-violet emitting tubes disposed therein, and powder generating means connected to said tubes to energize the same and cause the heated air to be further dispersed.

3. The pre-heater of claim 1, wherein the outlet is circular in shape and is in communication with one end of the elongated inlet.

4. The pre-heater of claim 3, wherein the housing is formed of high heat resistant and electronic resistant plastic.

5. The pre-heater of claim 4, wherein the air inlet means is a conduit means positioned in the lower part of the housing, and is shaped to cause the air to spread over the major portion of the filter means before it enters the housing.

6. The pre-heater of claim 5, wherein the outlet and of said housing is connected to an ultra-violet air treated generator.

7. The pre-heater of claim 4, wherein the outlet is positioned over a carburetor of a vehicle engine.

* * * * *